United States Patent [19]

Norlander

[11] Patent Number: 4,544,145

[45] Date of Patent: Oct. 1, 1985

[54] VISE FOR SMALL OBJECTS

[76] Inventor: Norman E. Norlander, 9002 Fruitland Ave., Puyallup, Wash. 98371

[21] Appl. No.: 503,426

[22] Filed: Jun. 13, 1983

[51] Int. Cl.$^4$ .............................................. B23Q 1/04
[52] U.S. Cl. .................................... 269/69; 242/7.19; 269/71; 269/76; 269/101; 269/907; 269/238; 269/254 CS
[58] Field of Search ............... 43/1; 242/7.19; 269/69, 269/70, 71, 76, 101, 238, 254 CS, 907

[56] References Cited

U.S. PATENT DOCUMENTS

| 1,216,552 | 2/1917 | Dodge et al. | 269/69 |
|---|---|---|---|
| 2,120,571 | 4/1937 | Reichenstein et al. | 312/149 |
| 2,236,781 | 5/1938 | Pannier | 43/1 |
| 2,332,655 | 10/1943 | Miles | 242/7 |
| 2,486,142 | 10/1949 | Fong | 43/1 |
| 2,489,547 | 11/1949 | Temple | 242/7 |
| 3,060,613 | 10/1962 | Murray | 43/1 |
| 4,134,577 | 1/1979 | Price et al. | 269/71 |
| 4,169,562 | 10/1979 | Reuzetti | 242/7 |
| 4,184,645 | 6/1979 | Starling | 242/7 |
| 4,216,948 | 8/1980 | Carter | 269/71 |

FOREIGN PATENT DOCUMENTS

| 1092879 | 4/1955 | France . |
| 1199376 | 12/1959 | France . |
| 483781 | 2/1970 | Switzerland . |

Primary Examiner—Frederick R. Schmidt
Assistant Examiner—Judy J. Hartman
Attorney, Agent, or Firm—Keith D. Gehr

[57] ABSTRACT

A vise for holding small objects. It is particularly useful as a fly tying vise. It comprises a support bearing a housing having a rotatable central arbor carried in low friction bearings. The preferred form has a hub mounted at each end of the arbor. One hub houses a clutch or other locking device. The other hub bears a clamping arrangement having fixed and moveable members with distal jaw portions adapted to hold an object such as a fishhook. The clamping arrangement has a longitudinal axis essentially parallel to but off-axis from the longitudinal axis of the arbor. The axis of the arbor does not pass through the jaws of the clamping arrangement. This permits a hook to be held in the vise with its shank lying on the axis of rotation of the arbor. In this way body thread or other dressing can be rapidly and accurately applied as the fly is created. Jaw members have essentially parallel and planar opposing faces with the maximum opening being controlled by an adjusting screw. This screw also serves as the fulcrum point of a lever arrangement which multiplies the clamping force applied to an object being held in the jaws. The off-axis location of the clamping arrangement causes it to come to a resting position directly below the axis of the arbor when the arbor is free to rotate.

8 Claims, 10 Drawing Figures

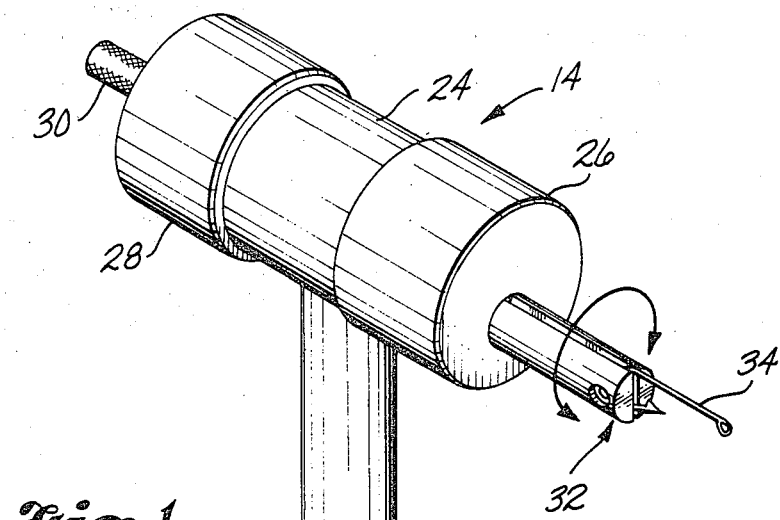
Fig. 1
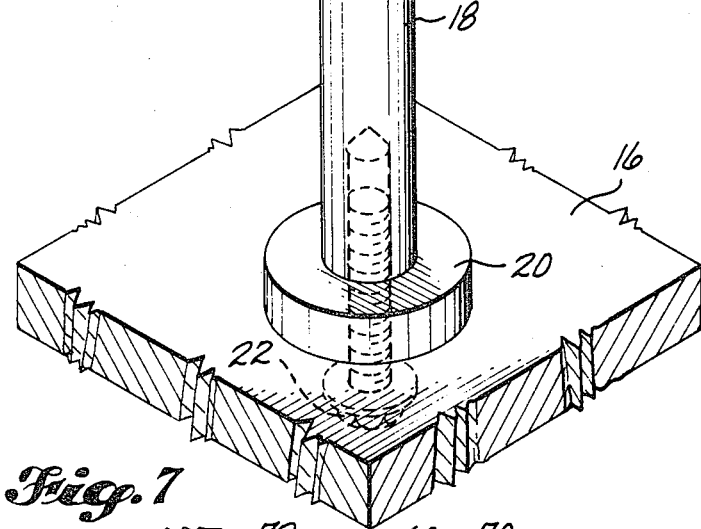
Fig. 7
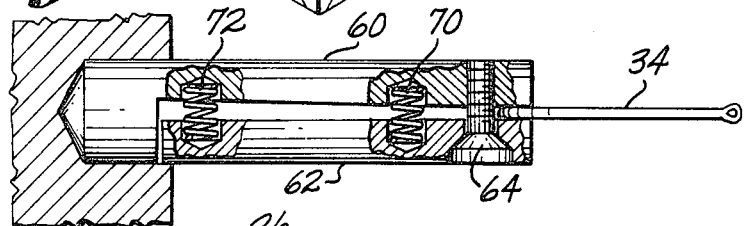
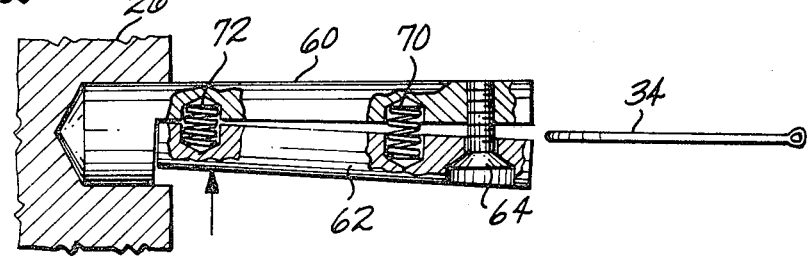
Fig. 8

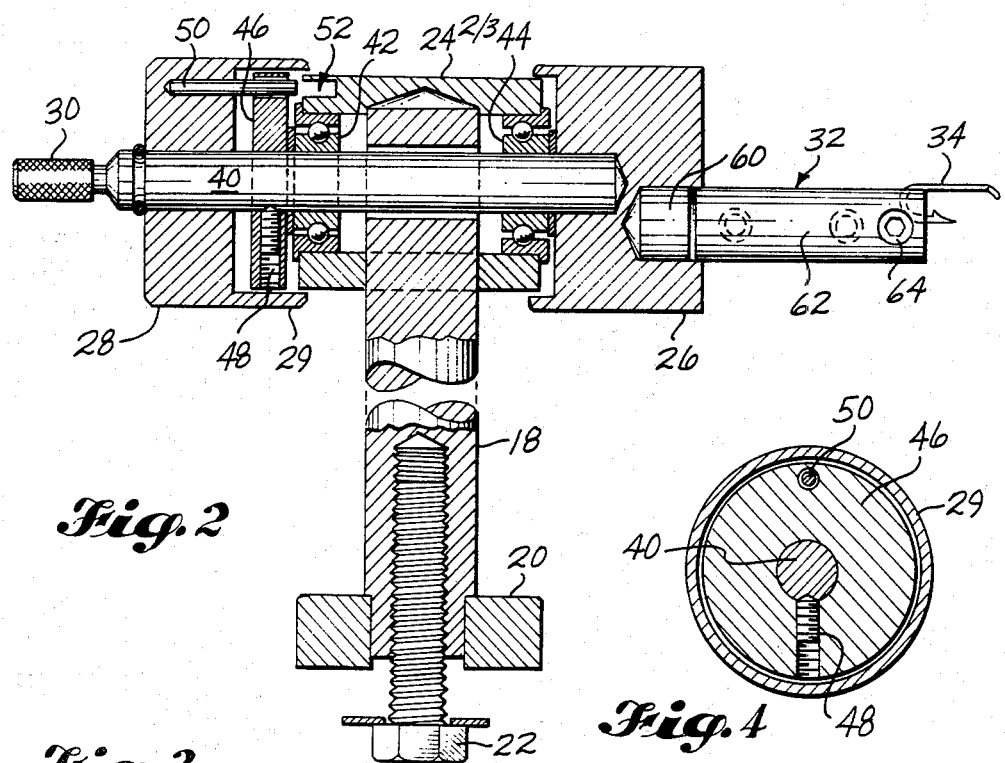
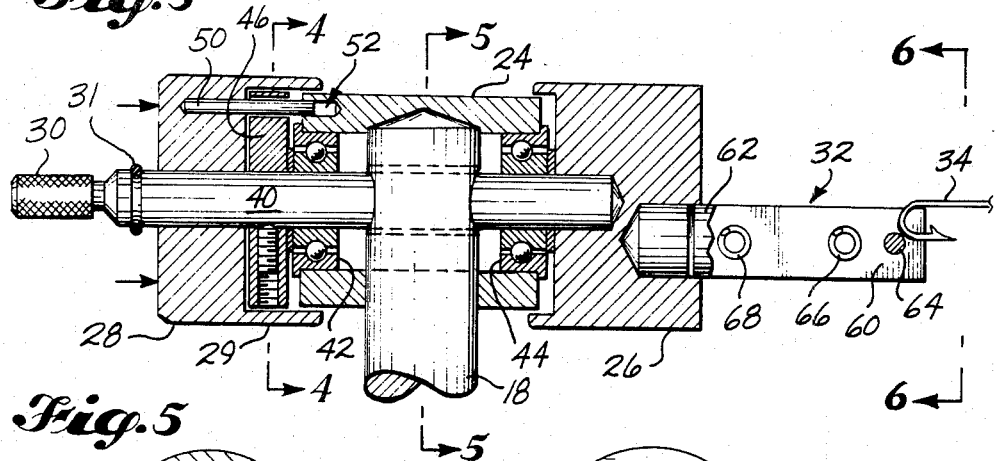
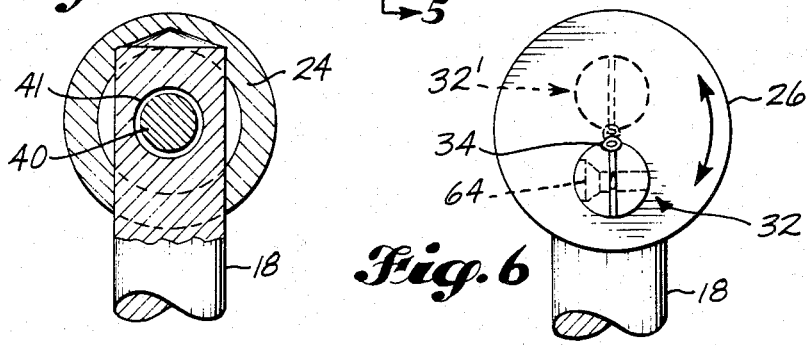

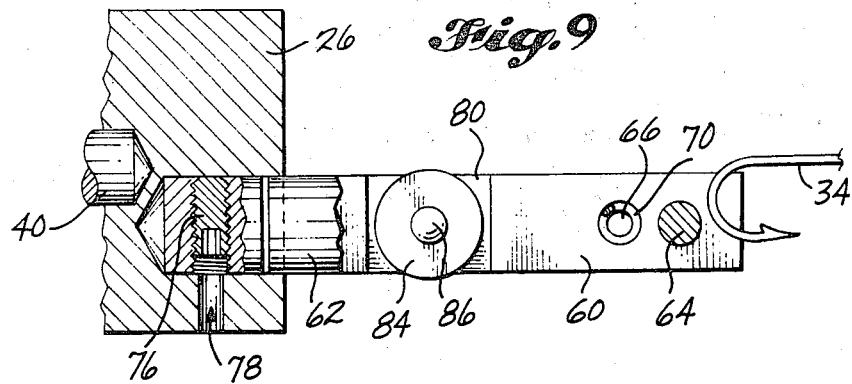
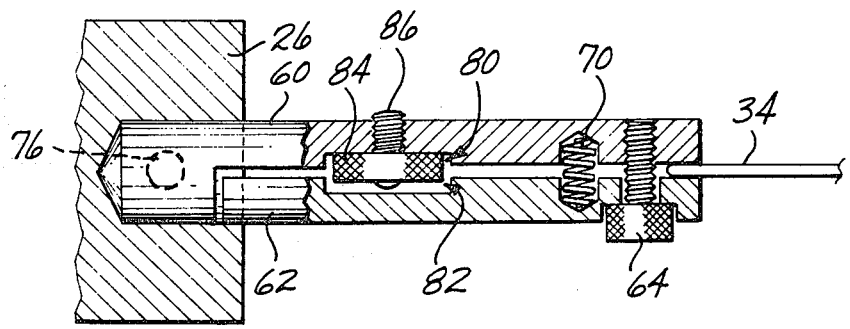

VISE FOR SMALL OBJECTS

BACKGROUND OF THE INVENTION

The present invention is directed to an axially rotatable vise for holding small objects. It is particularly useful for holding fishhooks while tying artificial flies and similar lures.

The use of artificial flies for fish lures apparently dates back into antiquity. These flies comprise carefully chosen pieces of feathers and other materials which are tied to a fishhook to simulate either a real or fanciful insect. In view of the well known propensity for trout and other species of game fish to be highly selective in their feeding habits, it is necessary for flies to be tied with considerable skill if the fisherman hopes to be successful. A basic and essential piece of equipment in the process of making artificial flies is the small vise which rigidly holds the hook in the desired position while the dressing is being applied. Until one studies the requirements which must be met, it would seem that a fly-tying vise would be an easy piece of equipment to design. That this is not so is well attested to by the literally dozens of different vise designs available for the professional or recreational fly-tier. While each of these vise designs may have it's limited group of fans, few of them have found general and broad acceptance.

One of the difficulties in designing a good fly tying vise lies in the requirement that it must hold hooks which range from several centimeters in length to those which are only a few millimeters long. These must be securely anchored in a manner so that the shank of the hook is accessible to the artisan. Quite commonly, the vise does not hold the hook tightly, especially when larger flies are being tied, so that it slips in the jaws when body wrapping is being applied. In many other cases, the vise does not allow ready visual accessibility so that the artisan can see only the top of the fly, or the bottom of the fly, which he is preparing. The vise also must be configured so that it will not physically interfere with applying the dressing to the hook.

In general, fly tying vises use a collet-type arrangement to apply or release holding pressure on the hook. A smaller number of vises use different arrangements in which the hook-holding jaws are loosened or tightened by a screw or other means. Most vises hold the fly in a fixed position. Much less commonly, the vise will permit the fly to be rotated so that the artisan can see or work on different aspects during the process.

Prior designs of fly-tying vises are well exemplified in both the American and European patent literature. As examples, French Pat. No. 1,092,879 and Swiss Pat. No. 483,781 show vises for holding hooks while applying leaders. The French vise is rotatable about a longitudinal axis. French Pat. No. 1,199,376 shows a vise having a shaft rotatable around it's longitudinal axis. The end of the shaft is split and is equipped with a screw which tightens the two halves to hold the hook. U.S. Pat. No. 2,120,571 to Reichenstein et al. shows a vise in which a hook is secured in a fixed clamp between wing nut activated jaws. U.S. Pat. No. 2,236,781 to Pannier is apparently one of the more successful types since similar vises are marketed presently. This vise has collet-type jaws and is tiltable to allow minor adjustment of the working position. Fong, in U.S. Pat. No. 2,486,142, shows a split-jaw type of clamp activated by a screw having a lever handle. This is tiltable but not rotatable. Murray, in U.S. Pat. No. 3,060,613, shows a somewhat unusual type of fly-tying vise in that it also has means for holding the hairs or other elements of a streamer-type fly in position. U.S. Pat. No. 4,184,645 to Starling is a collet-type vise which holds the hook in a fixed position and has an ancillary means for rapidly applying body wrapping. U.S. Pat. No. 2,332,655 to Miles is a relatively complex motor driven fly-tying machine dedicated to the problem of rapidly applying body wrapping around the hook shank. Temple, in U.S. Pat. No. 2,489,547, is a simple vise having a screw activated split clamp similar to that shown in Fong. This vise is also rotatable along it's longitudinal axis by means of a small hand crank. Reuzetti, in U.S. Pat. No. 4,169,562, shows a similar rotatable vise. Reuzetti, however, has the hook clamping device offset at an angle from the shaft so that the shank of the hook lies along the axis of rotation. Another rotatable vice which permits the hook shank to lie approximately along the axis of rotation is made by the Universal Rotating Vise Company, Holyoke, Mass., and is apparently unpatented. The jaws are axially located but the upper part of the jaws are ground away so that the hook is grasped by a pair of small protruding point-like surfaces. Another rotating vise is shown in U.S. Pat. No. 4,134,577, to Price. The feature which apparently makes this vise unique is a clamp which is broadly adjustable to accommodate bench surfaces of widely varying thicknesses.

The above list of devices includes those of the general types which appear to be most closely related to the subject of the present invention. While many of them are excellent fly-tying vises, all have certain deficiencies which have been largely or wholly overcome by the vise which is the subject of the present invention.

SUMMARY OF THE INVENTION

The present invention comprises a vise for holding small objects, of which fish hooks being prepared into artificial flies would be exemplary. The vise has a mounting means by which it may be attached to a fixed support. A body means is further attached to the mounting means. This body means houses a rotatable arbor means which will normally be retained in low friction bearings, such as ball bearings. At least one hub means, and preferably two, are mounted at the ends of the arbor means. One hub carries an object clamping means which, if the vise was being used for tying artificial flies, would retain the fish hook. This clamping means is mounted at its proximal end to a hub means and bears a jaw portion at its distal end. The clamping means has a longitudinal axis which lies essentially parallel to but off-axis from the longitudinal axis of the arbor means. This is located sufficiently off-center so that the axis of the arbor means does not pass through the jaw portion of the clamping means. This enables a fish hook to be held so that its shank lies on the true axis of the arbor means.

While the vise may have only a single hub means mounted at one end of the arbor means, in its most preferable form it will have hub means mounted at each end of the arbor. These hubs should be of sufficient mass so that when the arbor assembly is rapidly rotated, they supply inertial energy to maintain the arbor in rotation for at least several revolutions. When hub means are used at both ends of the arbor, the hub opposite to the one that carries the object clamping means may have a clutch or other locking means which can alternatively permit or prevent shaft rotation. In its preferred form such a hub is slidable along the arbor from a locked position to a rotatable position.

The clamping means is preferably constructed with a fixed member, located in one of the hub means, and a cooperating movable member. These clamping means members preferably have essentially planar opposing faces. They are equipped with a jaw pressure control means which acts with the members to apply or release a clamping force to an object being held in the jaw portion. In one version of the vise, the clamping means will further have an adjusting screw means located immediately proximal to the jaw portion. Stated another way, this adjusting means will be immediately behind the jaw portion, between the jaws and the hub. This adjusting screw serves to control the maximum spacing between the jaw members of the clamping means, and it further serves as a fulcrum point about which limited movement of the movable member can take place. The clamping action is supplied by the jaw pressure control means which is located proximal to the adjusting screw. This is designed to apply a force which tends to separate the fixed and movable members at the point of force application. This force, acting across the fulcrum point provided by the adjusting screw, applies clamping pressure to the jaws. The distance between this pressure control means and the adjusting screw is preferably relatively large compared with the distance between the adjusting screw and the jaw portion so as to provide a mechanical advantage which multiplies the force applied by the pressure control means. This jaw pressure control means may be a spring located betweens the members of the clamping means, a screw, a cam, or a similar device. Movement between the fixed and movable members of the clamping means is preferably restricted so that the opposing surfaces of these members remain essentially parallel when an object is clamped in the jaw portion. One way of accomplishing this is to provide a recess in the hub in which the proximal end of the moveable member is retained in order to limit its movement.

It is an object of the present invention to provide a vise which will rigidly hold small objects.

It is another object of the invention to provide a vise which is rotatable about a longitudinal axis.

It is a further object of the invention to provide an improved fly-tying vise which is fully rotatable and which will hold hooks with their shank lying precisely on the axis of rotation.

It is yet another object to provide a fly-tying vise which is convenient for use and which enables flies to be tied rapidly and with precision.

It is still a further object to provide a rotatable vise that will always assume a predetermined position as rotation ceases.

These and many other objects will become readily apparent on reading the following detailed description taken in conjunction with the attached drawings.

BRIEF DESCRIPTION OF THE DRAWINGS

FIG. 1 is an overall isometric view of the vise.

FIG. 2 is a side elevation, partially cut away, showing the rotating mechanism with the locking means moved to a position so that the assembly is free to rotate.

FIG. 3 is a fragmentary view, similar to FIG. 2, in which the rotating assembly is locked, and in which the movable jaw portion is partially cut away to better show details.

FIG. 4 is a section taken through 4—4 of FIG. 3 showing further details of the locking mechanism.

FIG. 5 is a section taken through 5—5 of FIG. 3.

FIG. 6 is a section taken through 6—6 of FIG. 3 showing, in end view, the rotational pattern of the jaw assembly.

FIGS. 7 and 8 are top plan views, partially cut away, showing details of one form of jaw assembly.

FIG. 9 is a side elevation of another form of jaw assembly, again with the movable member partially cut away.

FIG. 10 is a top plan view of the alternate jaw assembly.

DETAILED DESCRIPTION OF THE PREFERRED EMBODIMENT

The present description contains the best mode known to the inventor of making the vise of the present invention. For the sake of convenience, the description will be limited to the use of the device as a fly-tying vise. It will be readily apparent to those skilled in the art that the usefulness is not limited to this application, and that many changes could be made in construction that should still be considered to be within the scope of the invention.

The device is best visualized by referring to FIGS. 1 and 2. The vise is generally shown at 14 as being mounted on a table or other surface 16. The vise itself is affixed to a support rod 18, bearing a flanged base 20. A bolt and washer, or flanged bolt 22 secures the device to it's mounting surface. If desired, the present mounting arrangement could be replaced by a C-clamp or similar assembly well known in the prior art. A body portion 24 is affixed to support rod 18 by means of a press fit or weldment. As seen in external view, the body portion bears two rotable hubs, a jaw hub 26 and a drive hub 28 with lip portion 29 designed to fit loosely over the body portion. Axially located within the body portion is an arbor 40 having a knurled end 30 which protrudes beyond the drive hub. Drive hub 28 is retained on arbor 40 by an O-ring 31. A jaw assembly 32 is shown generally as a protrusion from jaw hub 26. Jaw assembly 32 is shown holding a fish hook 34 in proper position to begin assembly of an artificial fly.

Arbor 40 is located coaxially in body portion 24. A clearance hole 41 is drilled in shaft 18 to permit the arbor to pass freely through this shaft without contact. Arbor 40 is retained in body portion 24 in ball bearings 42, 44. Near its left hand end, as seen in FIGS. 2 and 3, arbor 40 bears a pin guide plate or drive disk 46. The drive disc maintains rotational coupling of hub 28 to arbor 40 while permitting the hub to have a limited sliding action on arbor 40. This disk is fixed to arbor 40 by set screw 48. Drive hub 28 bears a pin 50 which is positioned to freely pass through a corresponding aperture in drive disk 46. A corresponding pin socket 52 is shown in body member 24. When drive hub 28 is pulled to the left along arbor 40, as shown in FIG. 2, the entire assembly is free to rotate in either direction. When drive hub 28 is moved to the right, as seen in FIG. 3, pin 50 engages socket 52 and the assembly is locked. It may be convenient to locate other angularly displaced sockets in body member 24, similar to socket 52, so that the assembly can be locked in positions other than the ones shown. At many times it is a convenience to be able to completely invert a fly during the dressing process.

The jaw assembly comprises a fixed member 60 and a movable member 62. These are conveniently formed from a piece of cylindrical rod which has been cut, milled, or otherwise formed so that it is separated into two pieces across a diameter along the longitudinal axis. While these jaw members are most conveniently made from cylindrical bar stock, it will be readily evident that they could be made from a stock having many other cross sectional configurations, such as square or hexagonal. Fixed jaw member 60 is tightly retained within a drill hole located in jaw hub 26. Preferably the distal end of movable member 62 is also loosely retained within the same drill hole. A set screw 64, located near the distal end of the jaw members unites them and controls the maximum clearance between the jaw members. The extreme distal end of these members, distal to adjusting screw 64, is considered to comprise the jaw portion of clamping means 32. In one version of the clamping means each member will have corresponding shallow sockets 66, 68 which will act as spring retainers. In the version shown in detail in FIGS. 7 and 8 a light spring 70 serves as a retainer. Spring 72, serves to provide the clamping force for the jaw portion at the distal ends of clamping means 60, 62.

In addition to retaining the clamping members in proper position and controlling spacing between them, adjusting screw 64 serves another important purpose. It tends to act as a fulcrum about which limited movement of the movable member can take place. The jaw assembly is constructed so that the distance from adjusting screw 64 to the extreme distal end is relatively small while the distance from screw 64 to pressure spring 72 is relatively large. The ratio of these distances provides a mechanical advantage which multiplies the force applied by spring 72 to the jaws at the distal end of the members. In this regard, spring 72 can be regarded as a pressure control means. The strength of this spring along with the mechanical advantage inherent in the construction will control the pressure applied to the object being held between the jaws. As shown in FIG. 8, a light pressure applied against the movable member at the location of spring 72 causes the jaws to open.

The jaw assembly 32 is mounted so that it is slightly below the axis of arbor 40. This allows the shank of hook 34 to lie precisely on axis. Yet it enables the fly-tying artisan to apply dressing all the way to the bend of the hook. In the fly-tying process one hand, normally the left hand of a right handed artisan, can conveniently rest against the body member and jaw assembly of the vise in order to apply feathers or other dressing material. The right hand can hold thread or other appropriate material for tying the dressing in place. The left hand can readily slide the drive hub back and forth along arbor 40 and cause the assembly to spin so that body material can be rapidly built up on the hook shank. There is no need to twist such wrapping around the hook shank as would be the case where the hook would be in fixed position.

An alternative jaw assembly is pictured in FIGS. 9 and 10. This also has a fixed member 60 and a movable member 62 united near their distal end by an adjusting screw 64. Retaining spring 70 is also identical to the same spring used in the previously shown construction. In the present case, fixed member 60 is mounted in jaw hub 26 by means of a set screw 76 which is accessed through hole 78 drilled into the jaw hub. The fixed member has milled into it a slot 80 and the movable member an equivalent slot 82 to accommodate a clamp nut or wheel 84. This is held on a clamp set screw 86 which normally would remain in fixed position in fixed member 60. The jaws can be rigidly locked against the object being held by moving clamp nut 84 against movable member 62.

One of the advantages of the present "off-center" location of the jaw assembly is that the anti-friction ball bearing construction permits the assembly to come to rest automatically in a position directly below the axis of the arbor so that the bend of the hook is held exactly vertically. The construction shown also maintains the jaws in an essentially parallel relationship regardless of the size of the hook wire being held between them. This enables the hook to be held much more firmly than does the point pressure normally applied by a collet type vise. The vise can be used by either left or right handed people with equal ease and without any modification. The device will further enable the experienced artisan to tie better and faster because the flies and readily made visible on all sides by rotating the arbor and the inertial features of the vise will permit more and rapid material application.

While certain alternative constructions which will be functionally equivalent to those described may be apparent to those skilled in the art, it is the intention of the inventor that such alternatives be included within the scope of the invention. The invention is thus to be considered as limited only by the following claims.

What is claimed is:

1. A rotatable vise for holding small objects which comprises:
   a. mounting means for attaching the vise to a fixed support;
   b. a body means attached to the mounting means;
   c. a freely rotatable arbor mounted in the body means, said arbor having a longitudinal axis essentially normal to the mounting means;
   d. hubs mounted at each end of the arbor adjacent to the body means, one of said hubs being fixed to the arbor and the other adapted for limited sliding movement along the arbor, said hubs being of sufficient mass so that when the arbor is rapidly rotated in either direction the hubs supply inertial energy tending to maintain said rotation;
   e. arbor locking means associated with the slideable hub, said means comprising a fixed pin mounted on the hub and a plurality of angularly spaced recesses located in the body means adjacent to the slideable hub and engagable by the pin so as to lock the arbor when the hub is moved along the arbor from a freely rotatable to a locked position; and
   f. object clamping means mounted proximally on the fixed hub, said clamping means having a fixed member mounted on said hub and a cooperating moveable member, said members having distally located, essentially planar, opposing jaw portions, the clamping means having a longitudinal axis which lies offaxis from but essentially parallel to the longitudinal axis of the arbor means so that the longitudinal axis of the arbor means does not pass through the clamping means and the clamping means will normally assume a resting position below the longitudinal axis of the arbor means when the arbor is not locked.

2. The vise of claim 1 in which the clamping means has an adjusting screw located immediately proximal to the jaw portions, said screw serving to control maximum spacing between the jaw portions and further serving as a fulcrum point about which limited moveable member movement can take place; a biasing spring located immediately proximal to the adjusting screw, said spring serving to maintain the jaws in a normally closed position; and a jaw pressure control means located proximal to the biasing spring.

3. The vise of claim 2 in which the clamping means is generally in the form of a cylinder split along the longitudinal axis.

4. The vise of claim 2 in which the distance between the adjusting screw and the pressure control means is relatively large compared with the distance between the adjusting screw and the jaw members in order to provide a mechanical advantage multiplying the force applied by the pressure control means to the jaw portion.

5. The vise of claim 2 in which the jaw pressure control means is a spring located between the members of the clamping means at a location closely adjacent the point at which the fixed member is mounted in the hub.

6. The vise of claim 2 in which the jaw pressure control means is a screw means.

7. The vise of claim 2 in which movement between the fixed and moveable members of the clamping means is restricted so that the opposing surfaces of the members remain essentially parallel when an object is clamped in the jaw portion.

8. The vise of claim 7 in which the proximal end of the moveable member of the clamping means is set into a recess in the hub to limit its movement.

* * * * *